United States Patent [19]
Buse et al.

[11] Patent Number: 5,788,473
[45] Date of Patent: Aug. 4, 1998

[54] INTEGRAL CLOSE COUPLING FOR A ROTARY GEAR PUMP

[75] Inventors: Frederic W. Buse, Allentown, Pa.; Mark D. Warner, Chesapeake, Va.

[73] Assignee: Ingersoll-Dresser Pump Company, Liberty Corner, N.J.

[21] Appl. No.: 762,788

[22] Filed: Dec. 10, 1996

[51] Int. Cl.[6] ............................. F04C 15/00; F16D 1/00
[52] U.S. Cl. .................. 418/206.1; 418/270; 403/364; 464/182; 464/903
[58] Field of Search ............................ 418/206.1, 270; 464/157, 182, 903; 403/305, 355, 356, 364; 417/410.3, 410.4

[56] References Cited

U.S. PATENT DOCUMENTS

| | | | |
|---|---|---|---|
| 2,060,473 | 11/1936 | Schumb | 464/157 |
| 3,063,261 | 11/1962 | Sorenson | 464/182 |
| 3,884,049 | 5/1975 | Pauli | 464/182 |
| 4,228,664 | 10/1980 | McCoy | 464/903 |
| 5,006,048 | 4/1991 | Jow | 417/410.4 |
| 5,545,091 | 8/1996 | Hoskins et al. | 464/157 |

Primary Examiner—John J. Vrablik
Attorney, Agent, or Firm—Robert F. Palermo

[57] ABSTRACT

A coupling for transferring power from a drive shaft to a driven shaft includes a first coupling member, having a substantially cylindrical body, with a cylindrical bore at a first end, longitudinal key arrangement within the bore for being rotatably driven by a keyed motor drive shaft, and a solid cylindrical portion at a second end having a distal face with an alternating plurality of longitudinally projecting drive lugs and longitudinally recessed pockets; and a second coupling member for installation on a driven shaft having a substantially cylindrical body with a first proximal face, providing a non-cylindrical socket means for receiving and for drivably engaging the driven shaft, and a second distal face with an alternating plurality of longitudinally recessed pockets and longitudinally projecting drive lugs, the longitudinally projecting drive lugs of the first coupling member fitting into the longitudinally recessed pockets of the second coupling member, and vice versa, to complete the coupling. Preferably both coupling members are molded from a 30% glass filled long fiber polyphenylene sulfide resin.

9 Claims, 4 Drawing Sheets

INTEGRAL CLOSE COUPLING FOR A ROTARY GEAR PUMP

BACKGROUND OF THE INVENTION

This invention relates generally to hydraulic pumps and more particularly to improvements in pump shaft coupling devices for gear pumps.

Rotary gear pumps are commonly driven with motors using commercial couplings attached to the motor and to the pump shaft. These coupling arrangements require a bed plate, for mounting the pump and the motor with adjustability of position to achieve alignment and connection between them, or other secondary mounting parts as well as additional space for installation. Often the gears are directly attached to the motor or to a stub shaft coupled to the motor shaft, both of which arrangements are considered close couplings in the pump industry. Such close couple designs eliminate the bed plate and extra space, but they usually require a special motor shaft for mounting the gear. This increases cost and adds to delivery lead time requirements. In addition, the added parts increase complexity of installation and removal of the pump, thereby contributing to parts damage and adjustment errors during such installation and removal.

The foregoing illustrates limitations known to exist in present gear pump drive coupling schemes. Thus, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a coupling device in a pump for transferring power from a drive shaft of an external motor to a driven shaft, comprising a first coupling member, having a substantially cylindrical body, with a cylindrical bore at a first end for receiving said drive shaft of said external motor, longitudinal key means within said bore for being rotatably driven by a key means of said drive shaft, and a solid cylindrical portion at a second end having a distal face with an alternating plurality of longitudinally projecting drive lugs and longitudinally recessed pockets; a second coupling member for installation on said driven shaft, said second coupling member having a substantially cylindrical body with a first proximal face, providing a non-cylindrical socket means for receiving and for drivably engaging said driven shaft, and a second distal face with an alternating plurality of longitudinally recessed pockets and longitudinally projecting drive lugs, the longitudinally projecting drive lugs of said first coupling member fitting into the longitudinally recessed pockets of the second coupling member, and vice versa; means for axially biasing said first coupling member into engagement with said second coupling member; and a cap member for retaining said coupling device in said pump and for supporting said means for axially biasing.

The foregoing and other aspects will become apparent from the following detailed description of the invention when considered in conjunction with the accompanying drawings.

DETAILED DESCRIPTION

Figure 1:
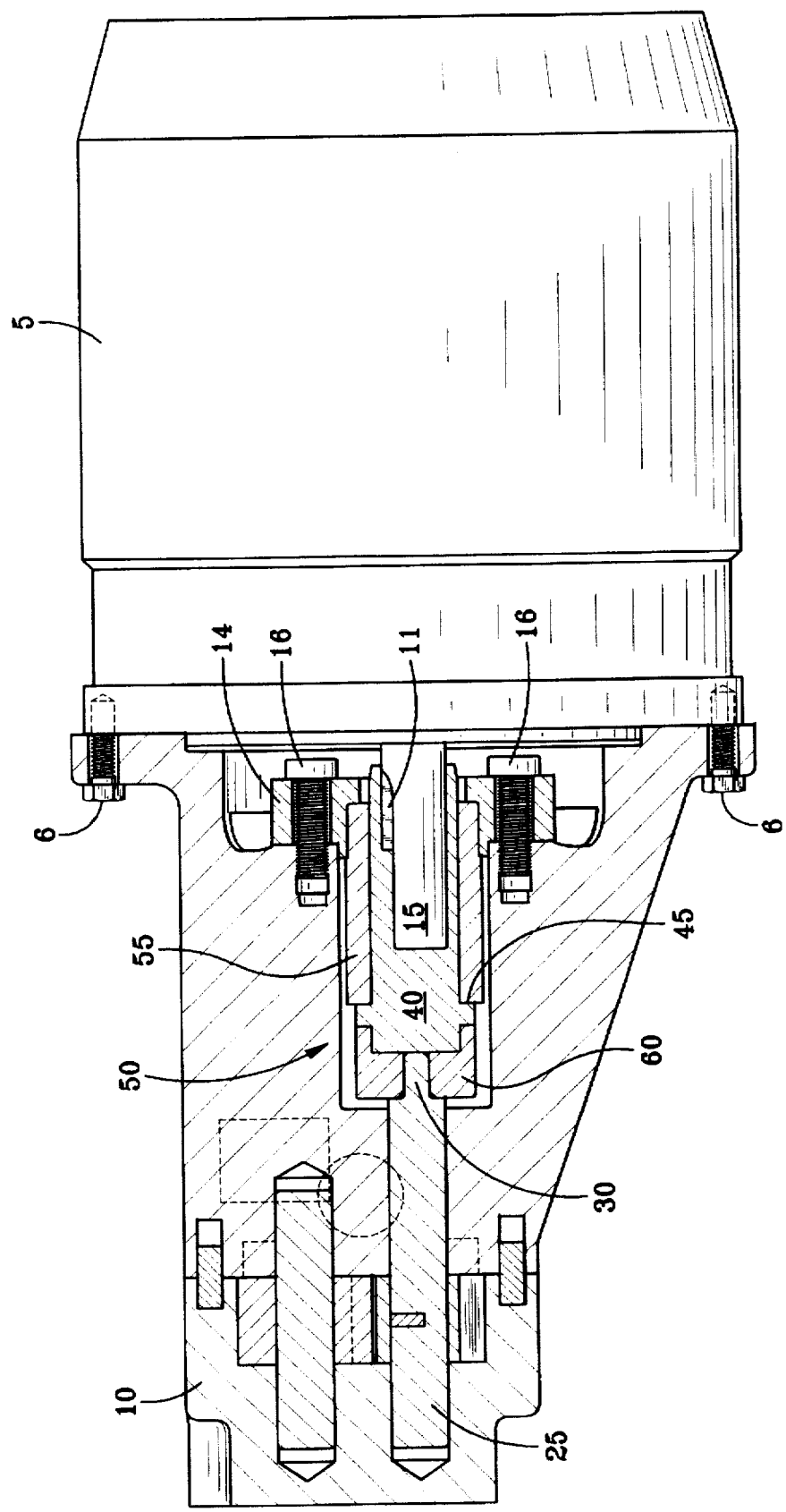
FIG. 1 is a partially sectional schematic side elevation view of a motor-pump assembly employing the coupling device of the present invention.
Figure 2:
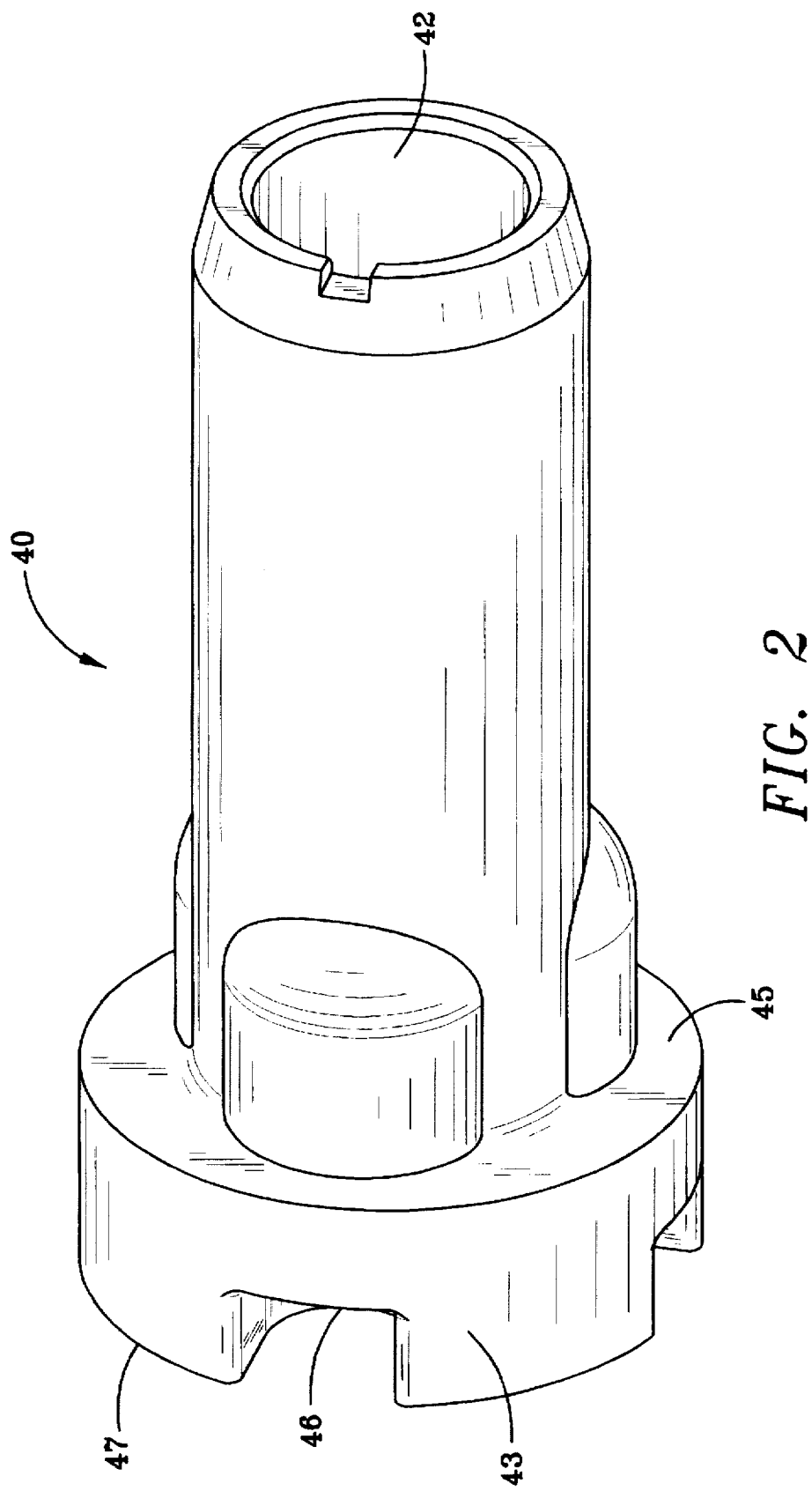
FIG. 2 is a schematic perspective view of the driving half of the coupling device.
Figure 3:
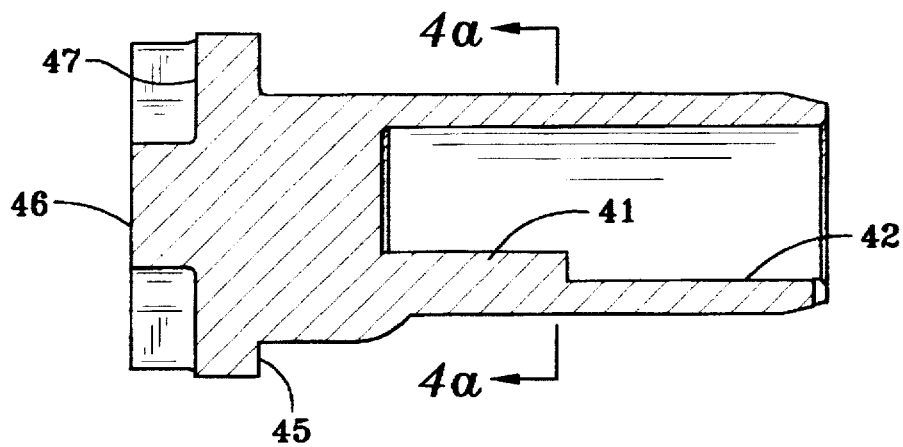
FIG. 3 is a schematic longitudinal cross sectional view of the driving half of the coupling device.
Figure 4A:
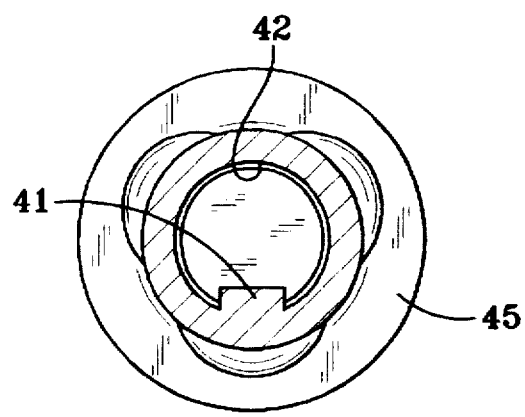
FIGS. 4a and 4b are schematic end views of the driving half of the coupling device.
Figure 4B:
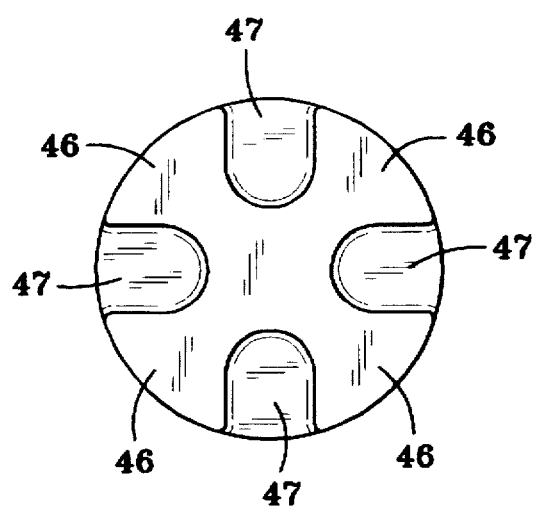

FIG. 1 shows a gear pump 10 attached to a drive motor 5 by bolts 6. The motor 5 is a standard electric motor having a motor drive shaft 15 with a standard drive keyway 11. A gear shaft 25 protrudes slightly from the pump 10 and has a non-cylindrical drive lug 30 formed on its outer end. The integral coupling 50 of the invention comprises a first driving member 40 and a second driven member 60. The driving member 40 has a hollow cylindrical first end for engaging the motor drive shaft 15 and a solid cylindrical second end for engaging the driven member 60. Reference to FIGS. 2, 3, 4a, and 4b simplifies the description of driving member 40.

The hollow cylindrical first end of the driving member 40 has a longitudinal cylindrical bore 42 in which a longitudinal key member 41 is provided for engaging the keyway 11 of motor drive shaft 15. Bore 42 is made to fit snugly on standard motor drive shaft 15. Key member 41 is preferably integrally molded with the body of driving member 40, but it could be made as a separate piece for engaging grooves or keyways in both the shaft and the driving member bore 42 or even as an integrally formed part of the motor drive shaft 15. The preferred embodiment provides the advantage of not weakening the driving member by thinning the wall to provide a keyway and permits a wide choice of materials for manufacturing the couplings. A fiber composite of 30% glass filled long-fiber polyphenylene sulfide (PPS) material, is preferred as providing the optimum blend of strength, heat resistance, and moldability. Of course, any metal or non-metal material having the required mechanical and physical properties for a specific application may be used, but the aforementioned PPS has been found suitable for elevated temperature pumping service.

Figure 5:
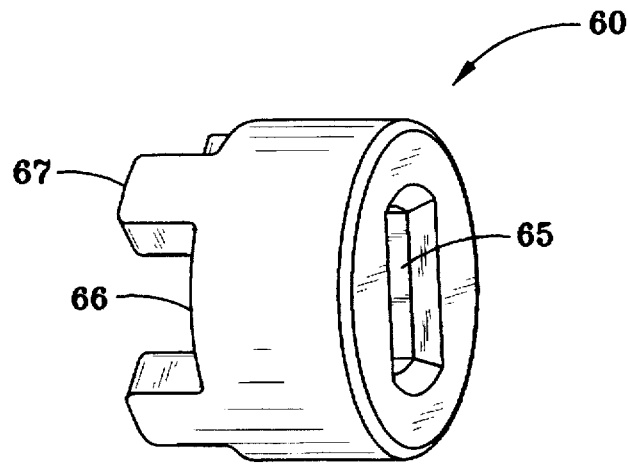
FIG. 5 is a schematic perspective view of the driven half of the coupling device.
Figure 6A:
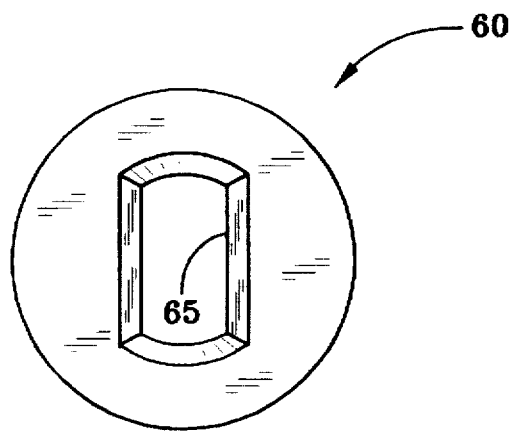
FIGS. 6a and 6b are schematic end elevation views of the driven half of the coupling assembly.
Figure 6B:
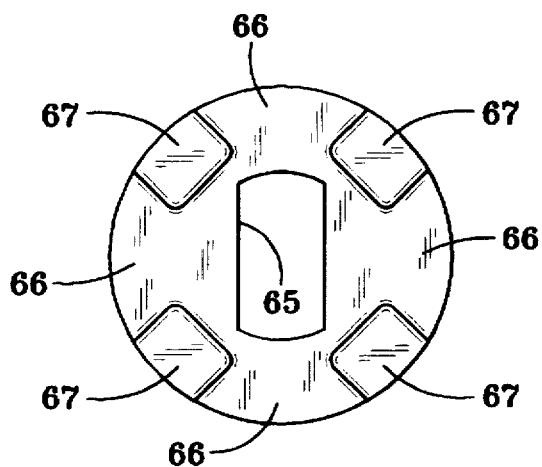

The solid cylindrical second end 43 of the driving member 40 has a shoulder 45, facing the first end, which acts as a seat for a spring seal 55 for sealing the pumped liquid inside the pump 10. Seal 55 extends from the shoulder 45 to the end cap 14, which is secured to the pump by a number of fasteners 16. In addition to providing the fluid seal, the spring seal 55 biases the driving member 40 against the driven member 60 to maintain a positive drive connection. The distal face of the driving member 40, i.e., the face farthest from the drive motor 5, has longitudinally extending lugs 46 and longitudinally recessed pockets 47 disposed alternately thereon to provide a positive drive when connected to the second driven member 60 of the coupling 50, which is described by making reference to FIGS. 5, 6a, and 6b.

Driven member 60 is a substantially cylindrical body having a first proximal face (the face closer to the gear) with a non-cylindrical axial drive socket 65 for achieving driving engagement with the non-cylindrical drive lug 30 of the gear shaft 25 of FIG. 1. Longitudinally extending lugs 67 and longitudinally recessed pockets 66 on a second distal face of the driven coupling member 60 provide a positive drive connection with the driving member 40.

As is apparent from the Figures, connection of the pump and motor is rather simple. The pump 10 is assembled, and the integral coupling 50 is placed on gear shaft 25 so that the driven coupling member 60 engages the non-cylindrical drive lug 30 of the shaft. The alternating lugs 67, 46 and pockets 66, 47 of the driving 40 and driven 60 members are engaged with each other. The spring seal 55 is placed against the shoulder 45 of the driving couple 40, and the end cap 14 is installed and fastened with bolts 16. The motor drive shaft 15 of the motor 5 is rotated to align its keyway 11 with the integrally formed key 41 of driving member 40, and the shaft 15 is inserted into the bore 42 of the driving member. The motor 5 and gear pump 10 are fastened together to form a unitary assembly using fasteners 6.

What is claimed is:

1. A coupling device in a pump for transferring power from a drive shaft of an external motor to a driven shaft of said pump, comprising:

a first coupling member, having a substantially cylindrical body, with a cylindrical bore at a first end for receiving said drive shaft of said external motor, longitudinal key means within said bore for being rotatably driven by a key means of said drive shaft, and a solid cylindrical portion at a second end having a distal face with an alternating plurality of longitudinally projecting drive lugs and longitudinally recessed pockets;

a second coupling member for installation on said driven shaft, said second coupling member having a substantially cylindrical body with a first proximal face, providing a non-cylindrical socket means for receiving and for drivably engaging said driven shaft, and a second distal face with an alternating plurality of longitudinally recessed pockets and longitudinally projecting drive lugs, the longitudinally projecting drive lugs of said first coupling member fitting into the longitudinally recessed pockets of the second coupling member, and vice versa;

means for axially biasing said first coupling member into engagement with said second coupling member; and an end cap member for retaining said coupling device in said pump and for supporting said means for axially biasing.

2. The coupling device of claim 1, further comprising:

a shoulder on a proximal face of the solid cylindrical portion of said first coupling member, said shoulder serving as a seat for said means for axially biasing to act against a mechanical seal for sealing pumped liquid within said pump and for biasing said first coupling member into engagement with said second coupling member.

3. The coupling device of claim 1, wherein the longitudinal key means within said bore for being rotatably driven by a key means of said drive shaft, comprises at least one rigid longitudinally extending member projecting into at least one longitudinal groove in either one of said drive shaft or a wall of said cylindrical bore from the other one of said drive shaft or said wall in said first coupling member.

4. The coupling member of claim 3, wherein said at least one rigid longitudinally extending member comprises a radially outwardly projecting key member integrally formed on said drive shaft for engaging said longitudinal groove in said wall of said cylindrical bore of said first coupling member.

5. The coupling member of claim 3, wherein said at least one rigid longitudinally extending member comprises a radially inwardly projecting key member integrally formed on said wall of the cylindrical bore of said first coupling member, said key member engaging said longitudinal groove on said drive shaft.

6. The coupling member of claim 5, wherein said first coupling member and said key member is integrally molded from a long fiber reinforced polymer resin.

7. A pump having an integral close-coupling device for receiving power from an external motor drive shaft and for transmitting the power to a pump shaft, said integral close-coupling device comprising:

a first coupling member, having a substantially cylindrical body, with a cylindrical bore at a first end, longitudinal key means within said bore for being rotatably driven by a key means of said motor drive shaft, and a solid cylindrical portion at a second end having a distal face with an alternating plurality of longitudinally projecting drive lugs and longitudinally recessed pockets;

a second coupling member for installation on said pump shaft, said second coupling member having a substantially cylindrical body with a first proximal face, providing a non-cylindrical socket means for receiving and for drivably engaging said pump shaft, and a second distal face with an alternating plurality of longitudinally recessed pockets and longitudinally projecting drive lugs, the longitudinally projecting drive lugs of said first coupling member fitting into the longitudinally recessed pockets of the second coupling member, and vice versa;

means acting on a shoulder on a proximal face of the solid cylindrical portion of said first coupling member for axially biasing said first coupling member into engagement with said second coupling member and for supporting a mechanical seal for sealing pumped fluid within said pump; and a cap member for retaining said coupling device in said pump and for supporting said means for axially biasing, said cap member having an opening for said motor drive shaft.

8. The integral close-coupling device of claim 7, wherein the longitudinal key means within the cylindrical bore of said first coupling member is integrally formed therein.

9. The integral close-coupling device of claim 7, wherein said first coupling member and said second coupling member are molded from a long-fiber reinforced polymer resin.

* * * * *